United States Patent Office 3,389,091
Patented June 18, 1968

3,389,091
STABILIZED SOLVENT COMPOSITION
Louis A. Joo and John B. Braunwarth, Crystal Lake, Ill., assignors, by mesne assignments, to Union Oil Company of California, Los Angeles, Calif., a corporation of California
No Drawing. Original application July 13, 1962, Ser. No. 209,750. Divided and this application Aug. 29, 1966, Ser. No. 607,082
4 Claims. (Cl. 252—356)

ABSTRACT OF THE DISCLOSURE

An emulsifier composition consisting essentially of a hydrocarbon solvent and nitrogen-containing carboxylic acids prepared by reaction of solvent extracts, obtained in the solvent extraction of mineral lubricating oils with a solvent selective for aromatic compounds, with nitrogen dioxide at a temperature exceeding about 100° C. The composition finds particular utility in preparation of stable toxicant compositions.

---

This is a division of application Ser. No. 209,750, filed July 13, 1962, now U.S. Patent No. 3,285,813.

This invention relates to new emulsifier compositions and toxicant compositions of improved stability prepared therefrom for use in combating pests, bacteria and parasites. More particularly, this invention relates to insecticidal, herbicidal, fungicidal, rodenticidal, disinfectant and germicidal compositions containing:

(1) A halogenated hydrocarbon toxicant,
(2) A hydrocarbon solvent, and
(3) A stabilizer comprising certain nitrated or nitrogen-containing complex carboxylic acids derived from solvent extracts obtained in the solvent refining of mineral lubricating oils and related sulfur-containing materials by nitrogen-dioxide oxidation of said solvent extracts.

This invention is based on the discovery that the complex nitrogen-containing mono-, di-, and polycarboxylic acids or fractions thereof or prepared from certain sulfur-containing starting materials or petroleum origin as hereinafter more definitely defined, quite unexpectedly are emulsifiers and stabilize hydrocarbon solvent solutions of halogenated hydrocarbon toxicants, such as DDT, and prevent or delay the precipitation of toxicants from the solvent for lengths of time sufficient for commercial application.

Furthermore, we have found that the herein-defined nitrated or nitrogen-containing complex carboxylic acids or fractions thereof are more effective as stabilizers for halogenated hydrocarbon toxicants in hydrocarbon solvent solutions than certain of the known prior art stabilizers. In addition, the stabilizers of this invention are effective at lower concentrations than the known prior art stabilizers and do not have the deleterious side effects which are characteristic of some of the prior art stabilizers now in use.

The number of organic toxicant compositions now in use for household, industrial and agricultural purposes is increasing. Many of the biocides or toxicants used are water-insoluble and, accordingly, are prepared in concentrated solutions in other solvents for emulsification with water at the time of application. Halogenated hydrocarbon toxicants, such as chlorinated hydrocarbons like DDT are prepared and shipped in concentrated hydrocarbon solvent solutions and diluted or emulsified for the end use. In preparing such emulsions or solutions various types of surface active and detergent agents are used to aid in holding the toxicant in solution and enhancing its usefulness. However, throughout this art there is the constant problem of the stability of the concentrated hydrocarbon solution of the concentrate, and, although certain stabilizers are known and used, their ability to enhance the stability, prolong precipitation of the toxicant and readily form dilute aqueous emulsions is varied and subject to a number of limitations, known to those skilled in this art.

A halogenated hydrocarbon toxicant, such as DDT (dichlorodiphenyltrichloroethane), is applied as a solution or emulsion of low concentration, i.e., about 5% by wt. (Muller, U.S. Patent 2,329,074, now Re. 22,700; Siegler, U.S. Patent 2,358,942). For purposes of storage and transportation, such a toxicant is prepared in more concentrated solutions in a hydrocarbon solvent, generally a saturated solution, for economic reasons. However, because of the diverse nature of the toxicants the differences in the properties of the stabilizers, and differences in solubilities, compatibilities and environments, the selection of the proper stabilizer is imperical, and the problem of concentrate stability during handling, shipping and storage persists, and the selected stabilizers of the prior art have limited application or lack versatility.

This is a particularly troublesome problem when handling or shipping hydrocarbon concentrates of DDT and related halogenated hydrocarbon toxicants. Although a gas oil, for example, will dissolve 25 to 30% by wt. of DDT at room temperature, the solution is unstable and deteriorates at lower temperatures during storage, handling or shipping in the winter months. Under these conditions the DDT slowly precipitates, generally over relatively extended periods of time, depending on the severity of the cold, and, unfortunately, this precipitate does not readily redissolve when the concentrate is warmed to normal temperatures. Peculiarly the DDT precipitates to a concentration lower than that of saturation at the lowered temperature and a large quantity of DDT is not precipitated as soon as the saturation temperature is passed or even after "seeding" by initial crystal formation occurs. The precipitation and deterioration of the concentrate is slow and substantially continuous over a period of many hours. Such well known surfactants as stearic acid, palmitic acid, lower fatty acids and the proprietary compositions "Paraflow" and "Santapour" do not offer sufficient protection from this deterioration of the concentrates. Other surfactants reduce the effectiveness of the toxicant or have deleterious side effects on plant foliage and the skin. By using the nitrogen-containing complex acids described herein in amounts ranging from about 0.5 to 10% by wt., the foregoing difficulties are mitigated or eliminated.

Accordingly, it becomes a primary object of this invention to provide stable toxicant compositions containing halogenated hydrocarbon toxicants dissolved in a hydrocarbon vehicle and containing a stabilizing amount of nitrogen-containing complex carboxylic acids derived from solvent extracts obtained in the solvent refining of mineral lubricating oils and related sulfur-containing, starting materials by nitrogen dioxide oxidation of said solvent extracts.

An object of this invention is to provide stable toxicant compositions containing halogenated hydrocarbon toxicants dissolved in a hydrocarbon vehicle under conditions of saturation or supersaturation stabilized by about 0.5 to 10% by wt. of nitrated or nitrogen-containing mono-, di-, and polycarboxylic acids and fractions thereof prepared by nitrogen dioxide oxidation of solvent extracts obtained in the solvent refining of mineral lubricating oils, using a solvent selective for aromatic compounds, or derived from related sulfur-containing starting materials.

Another object of this invention is to provide concentrated solutions of DDT in hydrocarbon solvents which are stabilized against precipitation by the incorporation of effective amounts of the nitrated complex carboxylic acids defined herein.

Another object of this invention is to provide concentrated solutions of DDT in hydrocarbon solvents which are stabilized against precipitation by the incorporation of effective amounts, not exceeding about 10% by wt., of certain nitrated complex carboxylic acids or fractions thereof derived from solvent extracts obtained in the solvent refining of mineral lubricating oils by nitrogen dioxide oxidation of said starting materials.

These and other objects of this invention will be described or become apparent as the description proceeds.

THE COMPLEX NITRO-CARBOXYLIC ACIDS

The novel stabilizing agents used in accordance with this invention and the methods for their preparation are described in detail in copending application Ser. No. 24,883, filed Apr. 27, 1960, now abandoned, by John B. Braunwarth and copending application Ser. No. 114,637 filed June 5, 1961 by Messrs. William L. Fierce and Roger L. Weichman.

Said copending applications set forth the art of liquid-phase oxidizing of alkyl-substituted aromatic compounds to form aromatic dicarboxylic acids and their esters using oxygen, i.e., terephthalic acid is prepared in this manner. The oxidation of the first alkyl group to a carbonyl group takes place readily but the subsequent oxidation of the resulting alkylated aromatic monocarboxylic acid to a dicarboxylic acid is more difficult. The art has resorted to the use of nitrogen dioxide, or compounds which release the $NO_2$ group in anhydrous liquid phase, with molecular oxygen-containing gas and applies relatively low temperatures to obtain conversion rates in the order of 10–50%.

The application of these methods to more complex and impure starting materials such as petroleum by-products, exemplified by solvent extracts using the low temperature techniques is according to said copending application ineffective. The discovery set forth in copending application Ser. No. 24,883 relates to carrying out the oxidation at temperatures of 100° C. to 200° C. producing a product which contains fewer nitro groups or nitrate groups and more carboxyl groups. The invention set forth in copending application Ser. No. 114,637 relates to the purification of the complex oxidation products prepared by the nitrogen dioxide oxidation of solvent extracts. The instant invention is based on the discovery that the nitrated or nitrogen-containing carboxylic acids produced by these nitrogen dioxide oxidation processes as applied to solvent extracts are effective agents in the stabilization of various toxicants in petroleum hydrocarbon solvent compositions.

The starting materials for the preparation of the stabilizers of this invention comprise any source of complex, high-molecular-weight, polynuclear, aromatic radicals, and heterocyclic nuclei containing sulfur, nitrogen, or oxygen in one or more rings, and containing oxidizable alkyl side-chains. A preferred source of this type of organic compound comprises solvent extracts obtained in the solvent extraction of mineral lubricating oils. Since the general process for solvent refining mineral lubricating oils is well known, and described in both of said copending applications, it is only necessary herein to set forth some of the properties thereof, also disclosed in said copending applications, and give some examples.

The solvent extracts from lubricating oils used as starting materials for this invention have the following general properties and characteristics.

TABLE I

| Characteristic: | Range of value |
| --- | --- |
| Gravity, ° API | 7.3–18.3 |
| Gravity, sp., 60/60° F. | 0.9446–1.0195 |
| Viscosity, SUS at 210° F. | 40–1500 |
| Viscosity index | −153–39 |
| Pour point, ° F. | 20–115 |
| Color, NPA | 2–5D |
| Molecular weight, average | Above 300 |
| Sulfur, percent wt. | 1.9 to 4.5 |
| Nitrogen, percent wt. | Below 1 |
| Aromatic compounds, percent (including heterocyclics) | 75–98 |
| Av. No. of rings/mean arom. mol. | 1.7–3.5 |

It is apparent that the yield and characteristics of the final oxidized acid products used as stabilizers in accordance with this invention may vary somewhat depending on the concentration and types of aromatic starting materials employed. The invention finds particular application to those solvent extracts containing from about 30% to 100% by weight of reactable aromatic and heterocyclic compounds of the type defined herein, although the process is economically feasible using solvent extracts containing as little as 20% by wt. of such aromatic compounds.

Solvent extracts are, accordingly, further characterized since the chemical and physical properties of this material, the complexity, etc., lends unique properties to the carboxylic acids produced therefrom. Thus, the average molecular weight of solvent extracts obtained in the preparation of 180–200 vis. neutral oils is about 340. These extracts contain about 75% to 87% of complex aromatic hydrocarbons and heterocyclics of aromatic character having an average of about 2.7 carbon rings per aromatic molecule. The extracts obtained during the manufacture of 150–160 vis. bright stocks contain from 85% to 98% of complex aromatics and heterocyclics having an average of about 3.3 carbon rings per aromatic molecule. When a typical solvent extract was subjected to carbon-type analysis using the method of Kurtz, King, Stout, Partikan and Skrabek (Anal. Chem., 28, 1928 (1956)), the results were: $C_a$–39%, $C_n$–30%, and $C_p$–31%. In this analysis the $C_a$ and $C_n$ include only the carbon atoms in the rings, while $C_p$ includes the carbon atoms present as paraffins and as side-chains on the aromatic and naphthene rings. Extract No. 19 in Table III had an average molecular weight of 340, contained 84% aromatics (and heterocyclics of aromatic type), as determined by the silica gel procedure, showed 16% saturated hydrocarbons, etc., and contained 86.4% carbon and 10.7% hydrogen.

The complexity of the types of compounds present, as based on these analyses, is illustrated by the following table.

TABLE II.—ESTIMATED CHEMICAL COMPOSITION OF SOLVENT EXTRACTS NOS. 19 AND 21 OF TABLE III

| Type of compound: | Approx. percent in the extract |
| --- | --- |
| Saturated hydrocarbons | 12.5 |
| Mononuclear aromatics: Substituted benzenes | 25.0 |
| Dinuclear aromatics: Substituted naphthalenes | 30.0 |
| Trinuclear aromatics: | |
|   Substituted phenanthrenes | 10.0 |
|   Substituted anthracenes | 5.0 |
| Tetranuclear aromatics— | |
|   Substituted chrysenes | 0.5 |
|   Substituted benzphenanthrenes | 0.2 |
|   Substituted pyrenes | 0.2 |
| Pentanuclear aromatics: Perylene | 0.01 |
| Sulfur compounds [1], oxygen compounds, etc. | 16.5 |

[1] Mainly heterocyclic compounds.

Table III following gives the physical and chemical characteristics of a number of solvent extracts from different sources, using different solvents, that can be used as the source of the complex radicals which characterize the nitro-acid stabilizers of this invention.

TABLE III.—SOURCES AND PHYSICAL CHARACTERISTICS OF SOLVENT EXTRACTS

| Ext. No. | Crude Source | Solvent | API Grav. | Sp. Gr. at 10° F. | Vis./ 100° F. | Vis./ 130° F. | Vis./ 210° F. | V.I. | Pour | Flash, ° F. | Fire, ° F. | Iodine No. (Wijs) | Percent C.R. | Percent Sulfur |
|---|---|---|---|---|---|---|---|---|---|---|---|---|---|---|
| 1 | East Texas | Phenol | 11.1 | | 23,319 | 4,750 | 282 | −40 | +55 | | | | 7.2 | 2.60 |
| 2 | do | do | 15.4 | | 15,000 | | 285 | +39 | | | | | | |
| 3 | do | do | 12.6 | | 35,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Santa Fe Springs | do | 10.2 | 0.9984 | | | 371 | | +65 | 520 | 600 | 69.4 | | |
| 10 | Texas | Furfural | 13.0 | 0.9791 | | | 1,509 | | +85 | 470 | 515 | 57.4 | | |
| 11 | Penn | Chlorex | 12.2 | 0.9843 | | | 1,365 | | +85 | 560 | 630 | 71.4 | | |
| 12 | Penn | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | Mid-Cont | Phenol | 13.6 | | | | 41.7 | −82 | +20 | | | | | |
| 15 | Mid-Cont | Chlorex | 13.6 | | | | 200 | −61 | +75 | | | | | |
| 16 | Mid-Cont | Phenol | 8.9 | | | | 569 | | +75 | | | | | |
| 17 | Mid-Cont | Furfural | 14.9 | | | | 50.2 | 25 | +20 | | | | | |
| 18 | East Texas | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 V.I. neutral, has an average molecular weight of 300, and contained 76.8% aromatics (by the silica gel procedure).

Extract No. 42 was obtained in the production of 150 V.I. Bright Stock, has an average molecular weight of 590, and contained 86% aromatics, 14% saturates, 86.2% carbon, 11.4% hydrogen, and averaged 3.3 aromatic rings per aromatic molecule.

Extract No. 43 was obtained in the production of 770 V.I. neutral, has an average molecular weight of 340, contained 87.0% aromatics, 13% saturates, 86.4% carbon, 10.7% hydrogen and averaged 2.7 aromatic rings per aromatic molecule.

Extract No. 44 was obtained in the production of 200 V.I. neutral, has an average molecular weight of 340, contained 87% aromatics, and 13% saturates.

Extract No. 45 was obtained in the production of 160 V.I. Bright Stock, contained 92% aromatics and 8% saturates.

In order to demonstrate the preparation of nitro acids to be used in accordance with this invention, several portions of a solvent extract having an original acid No. of 6.9 were oxidized with $NO_2$, using the prior art techniques as applied to pure alkyl-aromatic starting materials. The results are shown in Table IV.

TABLE IV.—OXIDATION OF SOLVENT EXTRACTS WITH $NO_2$

| Run No. | Temp., ° C. | Time, hrs. | Wt. $NO_2$ | Oxidized Extract Acid No. |
|---|---|---|---|---|
| 1 | 46 | 30 | 3.5 | 7.9 |
| 2 | 25 | 140 | 7.5 | 10.0 |
| 3 | 25 | 140 | 13.0 | 14.0 |
| 4 | 25 | 140 | 69.9 | 34.0 |
| 5 | 25 | 140 | 72.0 | 41.0 |

All of the reactions were carried out in sealed glass tubes. The reaction tubes had a capacity of about 160 cc. and were formed of glass tubing having an outside diameter of 1¾ inches, one end of which was closed to a test-tube end and the other end was jointed to a tube having an outside diameter of ⅜ inch.

The acids produced in Runs 1, 2 and 3 may be used as stabilizers in accordance with this invention, but the acids produced by Runs 4 and 5 are more effective. The product of Run No. 4 contained 3.8 weight percent of nitrogen, which, based on the average mol. wt. of 330 for the extract oil, indicated that approximately one nitrogen atom had been added per molecule of solvent extract. In accordance with this invention, such an acid represents the first member of a series of preferred nitro-acids derived from solvent extracts which show unusual effectiveness as corrosion inhibitors. This effectiveness is shared by those complex nitro-extract acids having up to 4 or 5 nitro-groups or atoms of nitrogen per molecule, which corresponds roughly to the number of carboxyl groups present in the molecule.

Control of the degree of nitration is shown in the following series of experiments:

Example I

A 110-cc. stainless steel autoclave was charged with 16.5 g. (0.05 mole) of Extract No. 19, 2 grams of concentrated sulfuric acid, and 14.5 g. of acetic acid. The mixture was cooled to 4° C. in an ice bath, and 2.5 g. (0.054 mole) of liquid nitrogen dioxide were added. The mixture was sealed in the autoclave and pressurized to 81 p.s.i.g. with oxygen. After being heated at 80° C. for 30 minutes, the mixture was cooled and poured into water. The organic phase was collected in benzene and washed with water until neutral, and then the benzene solvent was removed by evaporation. The acid number of the product was 25.9 and the nitrogen content was 2.6 wt. percent.

TABLE V.—OXIDATION OF SOLVENT EXTRACT WITH $NO_2$

| Run No. | Temp., ° C. | Wt. Percent $NO_2$ | Wt. Percent Nitrogen New Product | Acid No. | Mole Percent Yield Based on $NO_2$ | Mole Percent Yield per pass |
|---|---|---|---|---|---|---|
| 6 | 4-12 | 57 | 2.2 | 21 | 23 | 2.3 |
| 7 | 52 | 80 | 3.4 | 50 | 34 | 4.5 |
| 8 | 140 | 63 | 2.4 | 73 | 43 | 7.8 |

Although the conversion by nitrogen dioxide to acids was only 23.8%, and the molar yield per pass (based on nitrogen dioxide) was relatively low, the acids produced by Runs 6 and 7 may be used in accordance with this invention. The product of Run 8 is a preferred nitro-acid because the acid number is about 73 and about 2.5 wt. percent of nitrogen is present, indicating close to one nitrogen atom per molecule of extract.

Run No. 8 was conducted by placing 62 g. (0.19 mole) of Extract Oil No. 19 in a 200-cc. beaker and heating to 140° C. Nitrogen was slowly bubbled through the heated extract at the same time that gaseous nitrogen dioxide was bubbled through at a rate of 150 cc. per minute for 2.1 hours. At the end of this period, the mixture was cooled to room temperature. The mixture was washed with distilled water, dried, and found to contain 71 g. of acids. The results indicate that a temperature of above about 100° C. with at least about 50% by weight of nitrogen dioxide are necessary for the reaction. The weight ratio of nitrogen dioxide to extract should be between 0.4/1 and 0.8/1, 0.6/1 being preferred.

As previously stated, this invention is also directed to the use of purified nitrated-acids, prepared in accordance with copending application Ser. No. 114,367, as stabilizers. In accordance with said copending application, the $NO_2$-oxidized, complex, aromatic starting material, as just described in detail, is purified by water washing, the washed oil phase is contacted with an oil-insoluble alcoholic solution of ammonia, and the resulting ammonium salts are decomposed to produce substantially pure complex acids as the residue. The products so prepared are light brown solids, predominantly dibasic, and exhibit no appreciable solubility in ordinary solvents.

The first step of the process comprises contacting the complex aromatic oil with nitrogen dioxide at a temperature above 100° C., but not exceeding 200° C., and preferably about 120° to 160° C., for at least about 2 hours. The proportion of nitrogen dioxide to complex aromatic hydrocarbon is that which is sufficient to produce the desired carboxylic acids, which proportion is preferably between about 40% by wt. to 80% by wt., based on the weight of said hydrocarbons. Large excesses of nitrogen dioxide are to be avoided in order to minimize the danger of an explosion.

One technique is to place about 0.2 mol of aromatic hydrocarbon in a reaction container and heat the oil to a temperature of about 140° C. Nitrogen is slowly bubbled through the heated oil at the same time gaseous nitrogen dioxide is bubbled through the oil at a rate of 150 cc. per minute. The introduction of nitrogen and nitrogen dioxide is continued for 2 to 3 hours. At the end of this time, the reaction mixture is cooled to room temperature and the foregoing purification steps are applied.

This technique is demonstrated by the following examples.

Example II

A 125-g. portion of bright stock extract, derived by phenol extraction in the manufacture of high-viscosity-index bright stock and having an acid number of 2.5, was charged to a 250-cc., three-necked flask equipped with fritted-glass bubbler, mercury-sealed stirrer, and thermometer. The oil was heated to about 140° C. and maintained at that temperature for six hours while nitrogen (50 cc./min.), nitric oxide (80 cc./min.), and oxygen (40 cc./min.) were bubbled through it. The resulting product was cooled to room temperature and dissolved in toluene, after which it was extracted several times with a 2/1 mixture of methanol and water to remove water-soluble acids. After the solvent was stripped off, the washed reaction product was found to have an acid number of 29 and an average molecular weight of about 770. It weighed 146.5 g. The oxidation had increased the acid number from 2.5 to 29.

A 124.7-g. portion of the washed oil solution was then taken up in benzene and contacted sequentially with three batches of solvent consisting of 6 parts (by volume) of concentrated ammonium hydroxide, 75 parts of water, 150 parts of methanol, and 25 parts of carbon tetrachloride. The wash phases were combined, and the oil and wash phases were separately heated to constant weight on a steam bath. The oil had an acid number of 21.3 and an average molecular weight of 870, and weighed 118.3 g. The purified acids had an acid number of 151 (158, electrometrically), an average molecular weight of 670 (determined by boiling point elevation in tetrahydrofuran), and weighed 8.1 g. Because the total weight of these two products was slightly greater than the weight of starting material, it appears that a small amount of solvent remained in one or the other, or both, after they had been heated on the steam bath.

The acid product was solid, and had a light-brown color after it was ground with mortar and pestle. It was not soluble to any appreciable extent in water, acetone, benzene, nitrobenzene, toluene, nitropropane, isopropanol, or hexane, but it was highly soluble in N,N-dimethylformamide. Because there were 1.9 equivalents of acid per mole, it is apparent that the product was predominantly dibasic.

Example III

Sixty-two grams (0.19 mole) of solvent extract No. 19 is placed in a 200-cc. beaker and heated to 140° C. Nitrogen is slowly bubbled through the heated solvent extract at the same time gaseous nitrogen dioxide is bubbled through at a rate of 150 cc. per minute for 2.1 hours. At the end of this period, the mixture is cooled to room temperature, and dissolved in toluene. The toluene solution is extracted several times with a 2/1 mixture of methanol and water to remove water-soluble acids. The solvent is stripped off and the reaction product, having an acid number of 73 (mole percent yield based on $NO_2$ of 43; mole percent yield per pass 7.8), is taken up in benzene and contacted sequentially with three batches of solvent consisting of six parts (by volume) of concentrated ammonium hydroxide, 75 parts of water, 150 parts of methanol, and 25 parts of carbon tetrachloride. The washed phases are combined, and the oil and wash phases are separately heated to constant weight on a steam bath. The oil, containing the oil-soluble acids, exhibits an acid number of about 20, and the purified acids exhibit an acid number of about 150, have an average molecular weight of about 670, and exhibit the solubility characteristics of the purified acids of Example II.

Example IV

Sixty-three grams (0.19 mole) of solvent extract No. 19 is placed in a reaction container and heated to 150° C. Nitrogen is slowly bubbled through the heated solvent extract along with gaseous nitrogen dioxide at a rate of about 100 cc. per minute for about three hours. The concentration of nitrogen dioxide is about 30% that of the nitrogen. At the end of this period, the mixture is cooled to room temperature and dissolved in xylene. The xylene solution is extracted several times with a 3/1 mixture of methanol and water to remove water-soluble acids. The solvent is stripped off and the reaction product, having an acid number of about 178, is taken up in benzene and contacted sequentially with three batches of a solvent comprising six parts by volume of concentrated ammonium hydroxide, 70 parts of water, 155 parts of ethanol, and 25 parts of carbon tetrachloride. The washed phases are combined and the oil and wash phases are separately heated to constant weight on a steam bath. The oil, containing the oil-soluble acids, exhibits an acid number of about 25, and the purified acids exhibit an acid number of about 160 and have an average molecular weight of about 680. These acids exhibit the solubility characteristics of the purified acids of Example II.

In order to graphically illustrate the complexity of the nitrated or nitrogen-containing aromatic and heterocyclic acids which comprise the active solution stabilizers of this invention, the following simplified structures are given, omitting the positioning of the numerous alkyl, cycloalkyl substituents and heterocyclic nuclei present in the molecules:

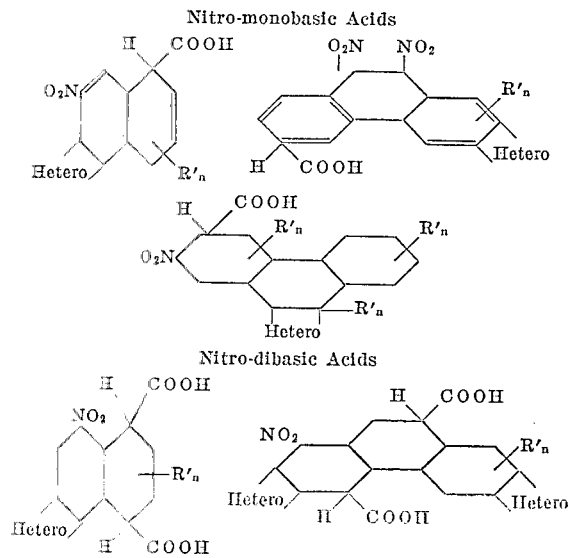

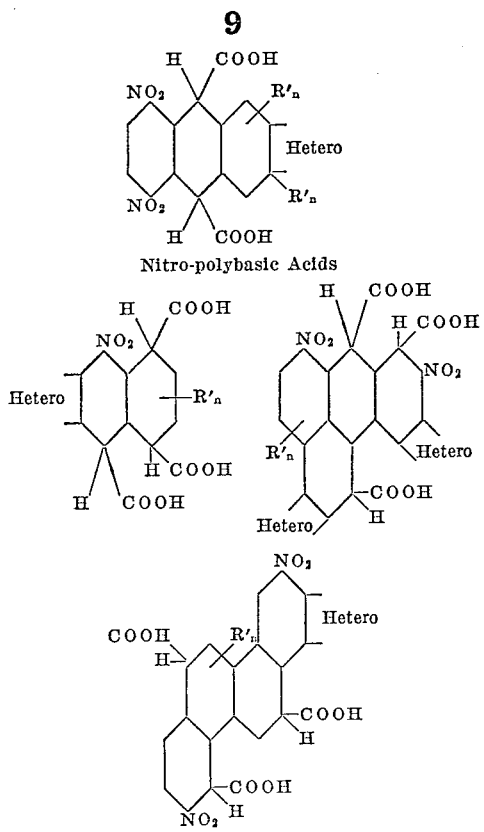

Nitro-polybasic Acids wherein R' comprises alkyl and/or cycloalkyl substituents having a sum of about 5 to 22 carbon atoms in each formula, n is the number of such alkyl groups, which may be from 3 to 10, and "hetero" represents one or more S-, N-, or O-containing heterocyclic rings in the molecule. The molecular weight of the acids is in the range of about 346 to 728, indicating the presence of about 1 to 3 $NO_2$ groups.

This invention has been demonstrated experimentally by comparing the effectiveness of "nitrated extract acids" and a dimerized $C_{18}$ fatty acid, identified as "E," in preventing crystallization from a saturated solution of DDT.

A 10-g. portion of "nitrated extract acid," prepared in accordance with the foregoing examples, Example I, Run 8 and Example II, was dissolved in a mixture of about 20 ml. of benzene and 200 ml. of n-pentane, the solution was chilled at −50° C. and filtered quickly, and the filtrate stripped of solvent by applying vacuum. The kerosine used for preparing solutions of DDT had the following properties:

| | |
|---|---|
| Boiling range °F | 351–550 |
| Flash point °F | 139 |
| Kauri-butanol No. | 25 |
| Aniline number °F | 151.5 |
| API gravity (60° F.) | 43.5 |

The DDT used was prepared by crystallizing technical grade DDT from acetone. The dimerized $C_{18}$ fatty acid "E" is a proprietary product having the following properties:

| | | |
|---|---|---|
| Mol. wt. | About | 600 |
| Acid value | | 186–194 |
| Sp. Gr., 15.5° C./15.5° C. | | 0.95 |
| Dimer content | Percent | 71 |
| Trimer content | do | 26 |
| Monomer content | do | 3 |

A saturated DDT-kerosine solution (8% wt. DDT) was prepared at room temperature and divided into several portions, and different amounts of "nitrated extract acids" were added to each portion. Acid "E" was added as the solution stabilizer in another series of DDT solutions.

After the stabilizers had become completely dissolved in the DDT-kerosine solutions, a 4-ml. sample of each solution was placed in a small test tube, each sample was seeded with a small crystal of DDT, and the test tubes were placed in a freezer where their temperatures were maintained at −21±° C. The same were checked periodically, and as soon as a significant amount of crystallization had become apparent, the test tubes were removed and centrifuged at each observation to determine the volume of precipitate. The results were as follows:

TABLE VI

| Sample No. | Stabilizer | Stab. Conc. (wt. percent) | Amount crystallized (mm.) after (hrs.)— | | | | |
|---|---|---|---|---|---|---|---|
| | | | 2.5 | 4.5 | 22 | 10 | 350 |
| 1 | None | | Trace | 6 | 9 | 10 | 10 |
| 2 | Nitrated acid | 0.5 | Clear | Trace | 6 | 6 | 6 |
| 3 | do | 1.0 | Clear | Clear | 4–5 | 4 | 4 |
| 4 | do | 2.0 | Clear | Clear | 1 | 3 | 3 |
| 5 | do | 5.0 | Clear | Clear | Trace | 0–1 | 1 |
| 6 | do | 10.00 | Clear | Clear | Clear | 0–1 | 1 |
| 7 | E | 0.5 | Trace | 6 | 11 | 15 | |

This invention is directed to the stabilization and solubilization of petroleum-solvent solutions of halogenated hydrocarbon toxicants such as are represented by the formula,

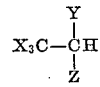

where X represent a member of the halogen group, and Y and Z each represents a radical selected from the group consisting of mono-valent aliphatic, aralkyl, and aryl radicals of the benzene series. The best known species coming within this definition is dichlorodiphenyltrichloroethane (commonly referred to as DDT). Other examples of toxicants coming within the formula and outside of the formula are: bis(methoxyphenyl)trichloroethane; dichlorodiphenyldichloroethane; benzenehexachloride; 1,2,4,5,6,7,8,8 - octachloro - 4,7 - methano - 3a,4,7,7a - tetrahydroindane; polychlorobicyclic - terpenes; the gamma isomer of 1,2,3,4,5,6-hexachlorocyclohexane, known commercially as lindane; 1,2,3,4,10,10-hexachloro-1,4,4a-5,8,8a-hexahydro-1,4,5,8-dimethanenaphthalene, known commercially as Aldrin; 1,2,3,4,10,10-hexachloro-6,7-epoxy-1,4,4a,5,6,7,8,8a - octahydro - 1,4,5,8 - dimethanenaphthalene, known commercially as methoxychlor; the following herbicides: (2,4-dichlorophenoxy)acetic acid and its derivatives such as the esters and salts, known commercially as 2,4-D; (2,4,5-trichlorophenoxy)acetic acid and its derivatives such as the esters and salts, known commercially as 2,4,5-T; and N-(trichloromethylmercapto)phthalimide; the fungicides bis(dimethylthiocarbonyl)-disulfide and pentachlorophenol; and the germicide cetyl trimethyl ammonium bromide.

The invention is intended to include biphenyl haloethanes which possess insecticidal properties, and includes ethanes having two or three chlorine or bromine atoms on one of the ethane carbon atoms. The other ethane carbon atom carries two phenyl groups which may be unsubstituted or substituted, and may be alike or different. Typical diphenyl haloethanes are 1,1,1-trichloro-2,2-bis(chlorophenyl)-ethane,
1,1,1-tribromo-2,2-bis(chlorophenyl)ethane,
1,1,1-trichloro-2,2-bis(fluorophenyl)ethane,
1,1,1-trichloro-2,2-bis(bromophenyl)ethane,
1,1-dichloro-2,2-bis(bromophenyl)ethane,
1,1,-dichloro-2,2-bis(chlorophenyl)ethane,
1,1-dichloro-2,2-bis(fluorophenyl)ethane,
1,1,1-trichloro-2,2-bis(chlorotolyl)ethane,
1,1,1-trichloro-2,2-diphenylethane,
1,1,1-trichloro-2,2-ditolylethane,
1,1,1,-trichloro-2,2-di(ethylphenyl)ethane,
1,1-bis(acetylphenyl)-2,2,2-trichloroethane,
1,1-dichloro-2,2-ditolylethane,
1,1-dichloro-2,2-di(ethylphenyl)ethane, 1,1,1-trichloro-2-phenyl-2-chlorophenylethane,
1,1,1-trichloro-2-tolyl-2-chlorophenylethane,
1,1,1-tribromo-2,2-tolyl-ethane,
1,1,1-trichloro-2,2-bis(chloronitrophenyl)ethane,
1,1,1-trichloro-2,2-bis(methoxyphenyl)ethane,
1,1,1-tribromo-2,2-bis(methoxyphenyl)ethane,
1,1,1-trichloro-2,2-bis(ethoxyphenyl)ethane,
1,1,1-trichloro-2-chlorophenyl-2-methoxyphenylethane,
1,1-thiocyanophenyl-2,2,2-trichloroethane, and the like.

The substituents of the phenyl rings may be in ortho, meta, or para positions. The actual materials of commerce usually consist of a mixture of isomers.

Table VII shows additional non-limiting examples of emulsifier compositions and stabilized toxicant compositions coming within the scope of the invention.

appearance of even a trace of precipitate at the end of 4½ hours as in sample numbers 2 and 3 is sufficient protection so as to provide stable concentrates under normal shipping, handling and storage conditions. Accordingly, the compositions of this invention meet the objective of stabilizing the toxicant against precipitation with low temperature—that is, the length of time that the toxicant solution may be subjected to temperatures low enough to cause it to be saturated or supersaturated without separation of the toxicant is greatly increased. Furthermore when such crystals finally separate from the compositions of this invention they are formed in small quantities only, remain suspended in the solution and quickly redissolve when the toxicant mixture is warmed to ordinary room temperature, or about 70° F.

TABLE VII

| Ingredient | Toxicant Compositions (Wt. percent) | | | | | | | | | |
|---|---|---|---|---|---|---|---|---|---|---|
| | 1 | 2 | 3 | 4 | 5 | 6 | 7 | 8 | 9 | 10 |
| DDT | 9.0 | | | | 9.5 | 10.0 | 25.0 | 21.0 | 5.0 | 9.0 |
| 2,4-D | | 10.0 | | | | 5.0 | | | | |
| Dieldrin | | | 20.0 | | | | | | | |
| Methoxychlor | | | | 25.0 | | | | | | |
| Kerosene | 90.0 | 70.0 | 70.0 | 72.0 | | | 67.0 | 19.0 | | 3.0 |
| Gasoline | | | | | | 70.0 | | | 90.0 | 81.0 |
| Naphtha | | 10.0 | 4.0 | | | | | 50.0 | | 2.5 |
| Stoddard Solvent | | | | | 86.5 | 8.5 | | | 1.0 | |
| Acid No. 1—Table IV | 1.0 | | | | | | | | | |
| Acid No. 2—Table IV | | 10.0 | | | | | | | | |
| Acid No. 4—Table IV | | | 6.0 | | | | | | | |
| Acid No. 5—Table IV | | | | 3.0 | | | | | | |
| Acid No. 6—Table V | | | | | | 5.0 | | | | |
| Acid No. 7—Table V | | | | | 6.5 | | | | | |
| Acid No. 8—Table V | | | | | | | 8.0 | | | |
| Acid of Ex. II | | | | | | | | 9.0 | | |
| Acid of Ex. III | | | | | | | | 1.0 | 1.0 | |
| Acid of Ex. IV | | | | | | | | | | 7.5 |

The term "solvent extracts" as used herein is meant to include the extract product obtained in the solvent refining of mineral lubricating oils, or fractions thereof, by solvent extraction using a solvent selective for aromatic compounds.

A wide variety of petroleum solvents or hydrocarbon solvents can be used as the vehicle of the compositions of this invention. The solubility of the toxicants increases with increased cyclic nature and aromaticity of the solvent, as does the phytotoxicity, skin irritation and expense. In using predominantly aliphatic hydrocarbons as the vehicle it is essential for purposes of the solubility of the toxicant therein that the solvent contain at least about 15% by volume of aromatic or cyclic compounds such as benzene, toluene, the xylenes, dimethylbenzenes, trimethylbenzenes, ethylbenzene, monomethylnaphthalenes, dimethylnaphthalenes, trimethylnaphthalenes, tetramethylnaphthalenes, ethylnaphthalenes, pine oil, terpenic hydrocarbons, cycloaliphatic compounds such as cyclopentane, cyclobutane, methylcyclopentane, dimethylcyclopentane, ethylcyclopentane, cyclohexane, methylcyclohexane, dimethylcyclohexane, cycloheptane, and related compounds.

The aliphatic portion of the solvent contains liquid aliphatic hydrocarbons such as pentane, hexane, isopentane, isohexane, heptane, octane and nonane and naphthas, Stoddard solvent, kerosene, gas oil, alkylates and related hydrocarbon mixtures, all of which boil in the range of about 170° F. to 760° F. One preferred species of solvent is deodorized kerosene, a neutral, inert white oil usually consisting of alkylated cycloparaffins and a small amount of paraffins. Deodorized kerosene is usually prepared by the action of fuming sulfuric acid on a kerosene distillate fraction at about 90° to 160° F. followed by neutralization with soda, water washing and filtration through an adsorbent clay.

The low temperature tests reported herein utilize a temperature (−21° C.) which is sufficiently low so that the The embodiments of this invention in which a privilege or property is claimed are defined as follows:

1. An emulsifier composition consisting essentially of (1) a solvent from the group consisting of kerosine, gasoline, naphtha and Stoddard solvent and (2) from about 0.5 to 10 percent by weight of complex polynuclear carboxylic acids prepared by:

solvent extraction of mineral lubricating oils with a solvent selective for aromatic compounds to obtain an extract having an average molecular weight above 300 and containing from 75 to 98 percent aromatic and heterocyclic compounds, and reaction of said extract with nitrogen dioxide at reaction conditions comprising a reaction period in excess of about 2 hours and a temperature of about 100 to 200° C., sufficient to oxidize said extract and form said complex polynuclear carboxylic acids having from 1 to about 5 nitro groups per molecule and from 1 to about 5 carboxylic acid groups per molecule.

2. The composition of claim 1 in which the solvent selective for automatic compounds is phenol.

3. The composition of claim 2 in which said complex polynuclear carboxylic acids contain about 1.9 to 4.5 percent by weight of sulfur and have an average of about 1.7 to 3.5 aromatic rings per mean aromatic molecule.

4. The composition of claim 2 in which said complex polynuclear carboxylic acids have an acid number of about 20 to 73 and contain about 1 to 3 nitro groups per molecule.

References Cited

UNITED STATES PATENTS 3,200,078    8/1965    Braunwarth et al. _____ 252—137

LEON D. ROSDOL, *Primary Examiner.*

B. BETTIS, *Assistant Examiner.*